US00RE42710E

(19) United States
(12) Reissued Patent
Chang

(10) Patent Number: US RE42,710 E
(45) Date of Reissued Patent: Sep. 20, 2011

(54) APPARATUS COMPENSATING A SCANNED OBJECT FOR OPTICAL CHARACTERISTICS ACCORDING TO LIGHT SOURCES OF DIFFERENT WAVELENGTHS

(75) Inventor: Wen-Yuan Chang, Hsinchu (TW)

(73) Assignee: Transpacific Systems, LLC, Wilmington, DE (US)

(21) Appl. No.: 11/283,479

(22) Filed: Nov. 18, 2005 (Under 37 CFR 1.47)

Related U.S. Patent Documents

Reissue of:
(64) Patent No.: 6,650,444
Issued: Nov. 18, 2003
Appl. No.: 09/665,444
Filed: Sep. 19, 2000

(51) Int. Cl.
*H04N 1/04* (2006.01)

(52) U.S. Cl. ..... 358/475; 358/474; 358/497; 358/498

(58) Field of Classification Search ..... 358/475, 358/474, 497, 498, 486
See application file for complete search history.

(56) References Cited

U.S. PATENT DOCUMENTS 4,751,376 A * 6/1988 Sugiura et al. ..... 250/201.8
5,153,636 A * 10/1992 Maetani ..... 355/45
5,381,245 A * 1/1995 Johnston et al. ..... 358/487
5,566,006 A * 10/1996 Yoshinaga et al. ..... 358/475
5,724,173 A * 3/1998 Chuan ..... 359/210.1
5,845,019 A * 12/1998 Yoshizawa et al. ..... 382/312
6,151,419 A * 11/2000 Aoki ..... 382/274
6,188,465 B1 * 2/2001 Rees et al. ..... 355/55
6,233,063 B1 * 5/2001 Bernasconi et al. ..... 358/474
6,252,684 B1 * 6/2001 Lin ..... 358/498
6,553,154 B1 * 4/2003 Cheng ..... 382/312
6,639,694 B1 * 10/2003 Tsanghuai ..... 358/471
7,034,967 B2 * 4/2006 Ochi et al. ..... 358/487

* cited by examiner

*Primary Examiner* — Houshang Safaipour
(74) *Attorney, Agent, or Firm* — Stolowitz Ford Cowger LLP

(57) ABSTRACT

The present invention is about an apparatus for scanning an object. The apparatus comprises an image capture module having a lens and a sensors array for capturing light after scanning the object. There are light sources comprising a visible light source and an infrared light source. Next, a key module of the present invention is a first translation module connected with the lens and the sensors array. The first translation module is-used for changing a first location of the lens and a second location of the sensors array according to using different the light sources so as to improve some optical characteristics, such as aberration resulting from different wavelengths of light sources. A power module connects with the first translation module and the light sources for supporting energy to the first translation module and the light sources. Moreover, a second translation module connects with the light sources and the image capture module, and the second translation driven by the power module. A control module connects to the power module and the image capture module, and a loading platform module has a platform and therein all the modules and the light sources are placed.

31 Claims, 4 Drawing Sheets

APPARATUS COMPENSATING A SCANNED OBJECT FOR OPTICAL CHARACTERISTICS ACCORDING TO LIGHT SOURCES OF DIFFERENT WAVELENGTHS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to an apparatus for scanning objects of various types, and more particularly to a scanner which can compensate for optical characteristics according to using different wavelength light sources.

2. Description of the Prior Art

Optical scanning apparatuses are currently in great demand as a result of the rapid development of high speed, low cost imaging devices and the ever decreasing cost of personal computers. Optical scanners, in general, are capable of reflective and/or transmissive scanning of documents, photographs and the like, whereby reflective scanning is used with opaque objects such as photographs and transmissive scanning is used with transparent objects, such as slides and the like. Reflective scanners project light onto the side of the object to be scanned. The reflected light is viewed by an optical sensor which converts the reflected light into digital code. The code is then transmitted to the operator's computer for further processing. Transmissive scanners operate on the same principle except that light is projected through the transparent object being scanned. A great demand exists for high quality, low cost, low maintenance, easy to calibrate, versatile optical scanners capable of both high and low resolution reflective and transmissive scanning.

As shown on FIG. 1, a conventional scanner typically comprises a control module 110, a light source 111, a power module 112, a image capture module 113, a loading platform module 114, and a translation module 115. The control module 110 comprises a host unit for image processing and a plurality of control circuits for scanning process. The light source 111 is for use while an object is scanned. The power module 112 comprises power units for supporting scanning process. The image capture module 113 comprises a plurality of lenses and optical sensors. The lenses are for performing optical pathways and the optical sensors, such as charge-coupled devices, are for sensing lights from the lenses and convert light signals into electric signals. A translation module is for translating the light source 111 and the image capture module in a main-scanning direction when the object is scanned.

Generally, there are many different types for scanned objects, such as paper document, transparent slide, and so on. A high-quality output image depends on the imaging system of a scanner for different types of objects. However, there are many factors related to the good imaging system, such as wavelength of light source, optical characteristics of optical devices and optical pathway, and so on. That is, the high-quality output images can't be satisfied for objects of various types if there is only one imaging system in a scanner.

SUMMARY OF THE INVENTION

Accordingly, it is an object of the present invention to provide an apparatus of scanning which has different light sources to fit the scanned objects of various types.

It is further object of the invention to provide a scanner which can adjust the location of a lens and a sensors array of the scanner according to using the light sources of different wavelengths.

It is another object of the invention to provide a scanner which can compensate for the optical characteristics of different light sources to improve the qualities of an output image.

In the present invention, an apparatus for scanning images comprises an image capture module having at least a lens and a sensors array for capturing light after scanning the object. A plurality of light sources comprise a visible light source and an infrared light source. Next, a key module of the present invention is a first translation module connected with the lens and the sensors array of the image capture module. To be specific, the first translation module is used for changing a first location of the lens and a second location of the sensors array according to using different the light sources so as to improve some optical characteristics, such as aberration resulting from different wavelengths of light sources. A power module connects with the first translation module and the light sources for supporting energy to the first translation module and the light sources. Moreover, a second translation module connects with the light sources and the image capture module, and the second translation driven by the power module. A control module connects to the power module and the image capture module, and a loading platform module has a platform and therein all the modules and the light sources are placed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

There is shown a representative portion of a scanner structure of the present invention in enlarged, cross-sections of two dimensional views for a scanner. The drawings are not necessarily to scale, as the size of the various devices are shown for clarify of illustration and should not be interpreted in a limiting sense. Accordingly, these regions will have dimensions, including length, width and depth, when fabricated in an actual device.

In the present invention, [an] *a* scanner for scanning an object comprises an image capture module having at least a lens and a sensors array for capturing light after scanning the object. A plurality of light sources comprise a visible light source and an infrared light source. Next, a key module of the present invention is a first translation module connected with the lens and the sensors array. To be specific, the first translation module is used for changing a first location of the lens and a second location of the sensors array according to using different the light sources so as to improve some optical characteristics, such as aberration resulting from different wavelengths of light sources. A power module connects with the first translation module and the light sources for supporting energy to the first translation module and the light sources. Moreover, a second translation module connects with the light sources and the image capture module, and the second translation driven by the power module. A control module connects to the power module and the image capture module, and a loading platform module has a platform and therein all the modules and the light sources are placed.

The embodiments of the present invention are described in detail hereinafter with reference to the accompanying drawings.

Figure 1:
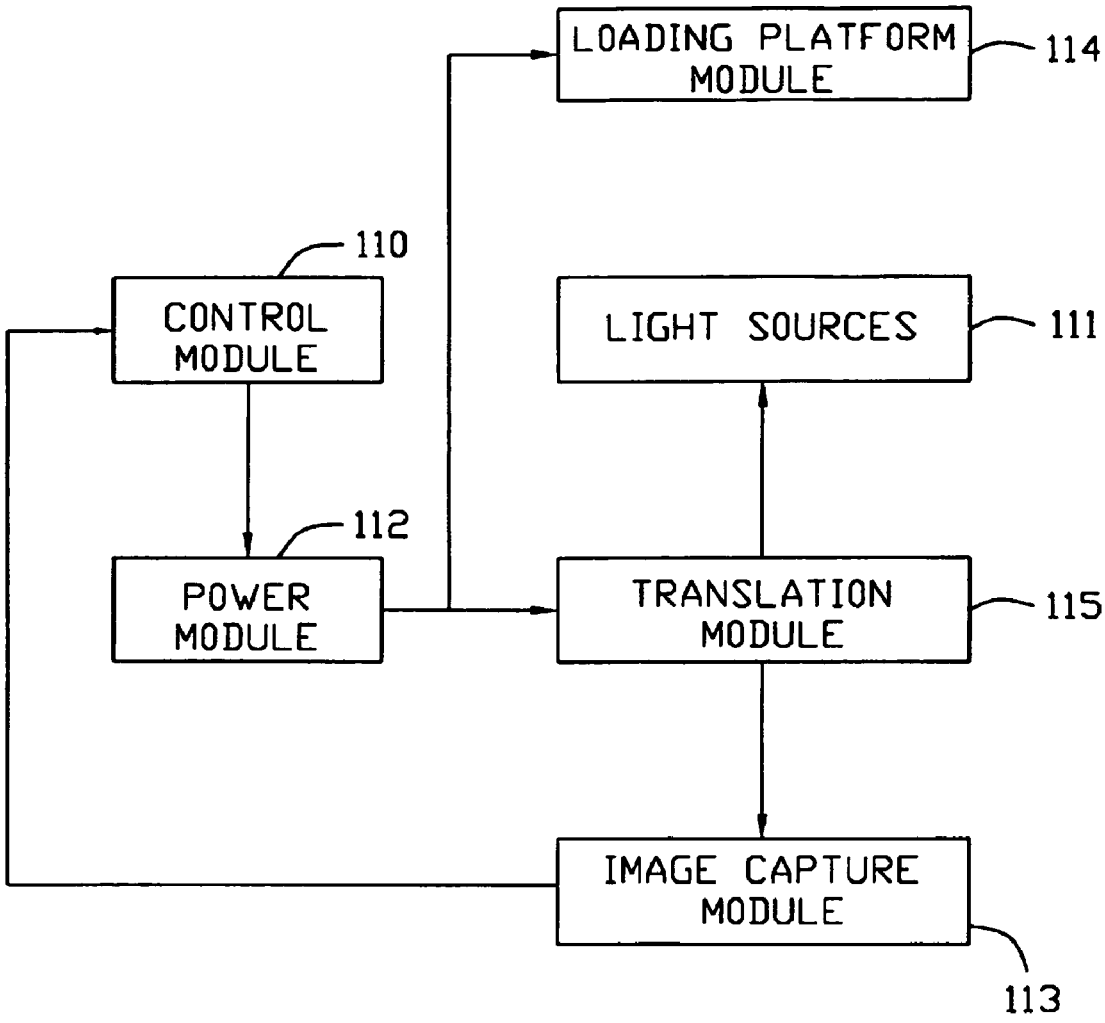
FIG.1(PRIOR ART)
FIG. 1 is a system diagram for a conventional scanning apparatus.
Figure 2:
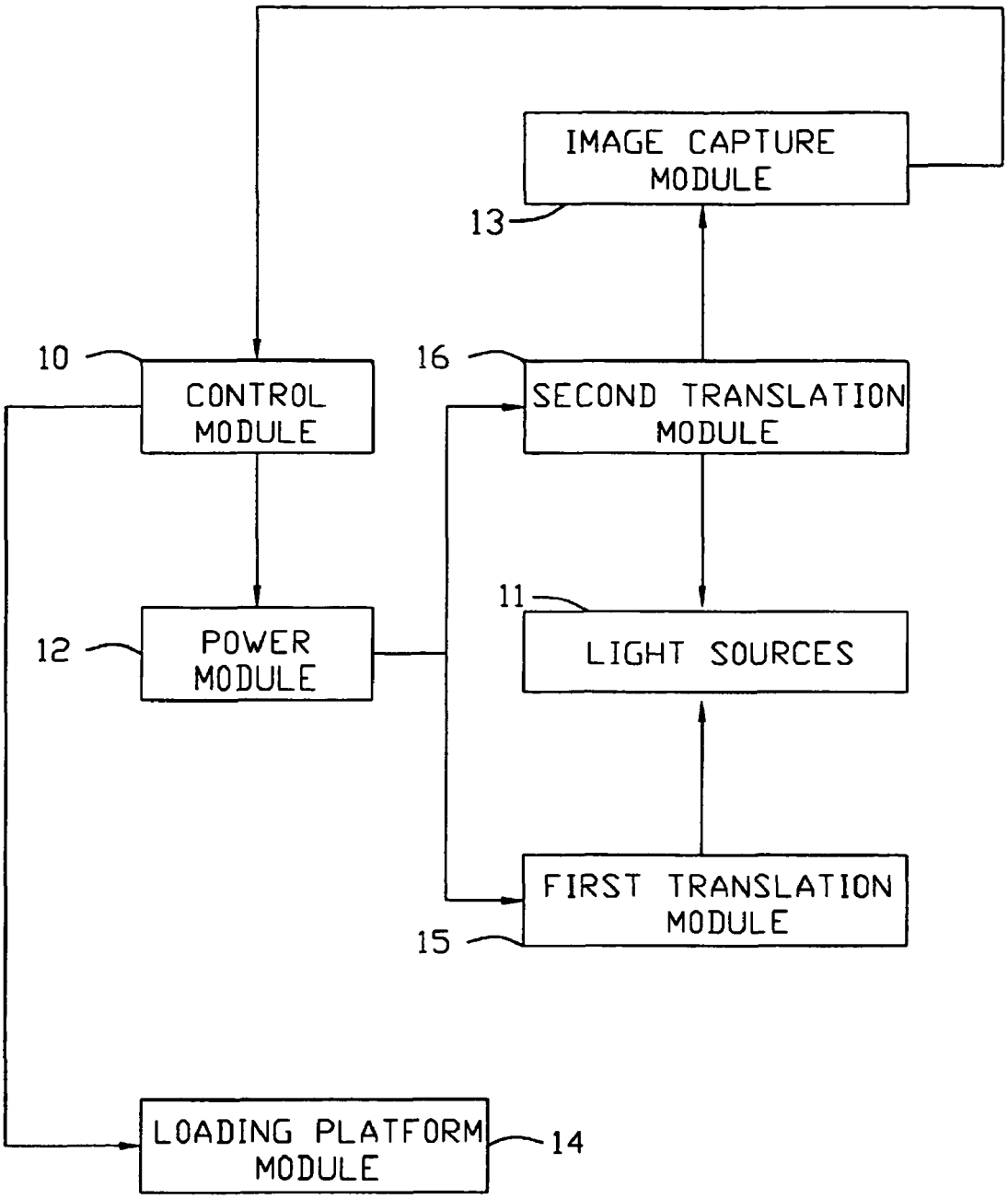
FIG. 2 is a system diagram for a scanning apparatus of the present invention.

In the present invention, a scanning apparatus comprises a control module 10, light sources 11, a power module 12, an image capture module 13, a loading platform module 14, a first translation module 15, and a second translation module 16, as shown in FIG. 2. The control module 10 comprises a host unit for data processing, and a plurality of control circuits for scanning process. The light sources 11 have at least two light sources with different wavelengths. In the present invention, one light source is a visible light source and the other is an infrared light source. The loading platform module 14 comprises a housing wherein all modules are placed.

Next, the image capture module 13 has at least a lens and a sensors array wherein sensors can be charge-coupled devices. The lens is for converging light from any object onto the sensors array. The sensors array is for transforming the light into corresponding image electric signals. The power module 12 comprises power supplies, motors, gears and belts for supporting energies to any scanning process.

Next, the first translation module 15 comprises a plurality of feeding devices, such as feeding rods and feeding screws. The first translation module 15 can be driven by the power module 12 and changing locations of the lens or the sensors array. In the present invention, the first translation module 15 can adjust the locations of the lens or the sensors array to compensating some optical defeats such as aberration that results from switching different light sources. Moreover, the second translation module 16 also comprises a plurality of feeding devices and feeds the light sources 11 and the image capture module 13 in any scanning motion.

Figure 3A:
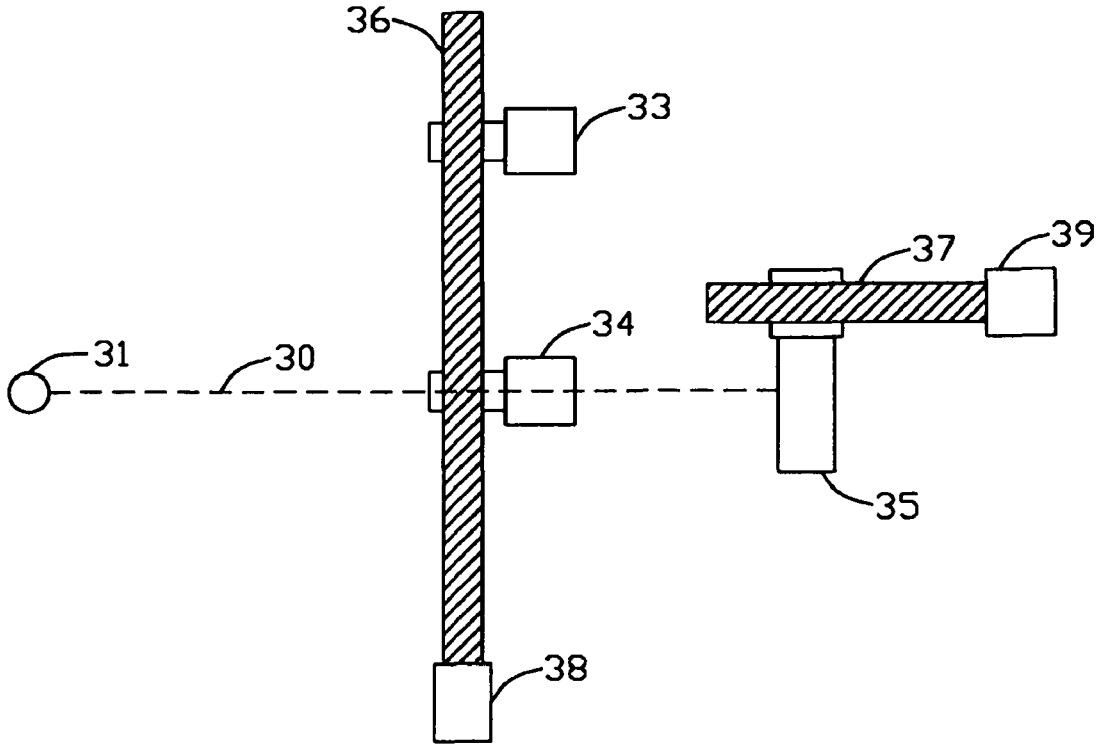
FIGS. 3A-3B are the schematic diagrams of devices in one preferred embodiment of the present invention.
Figure 3B:
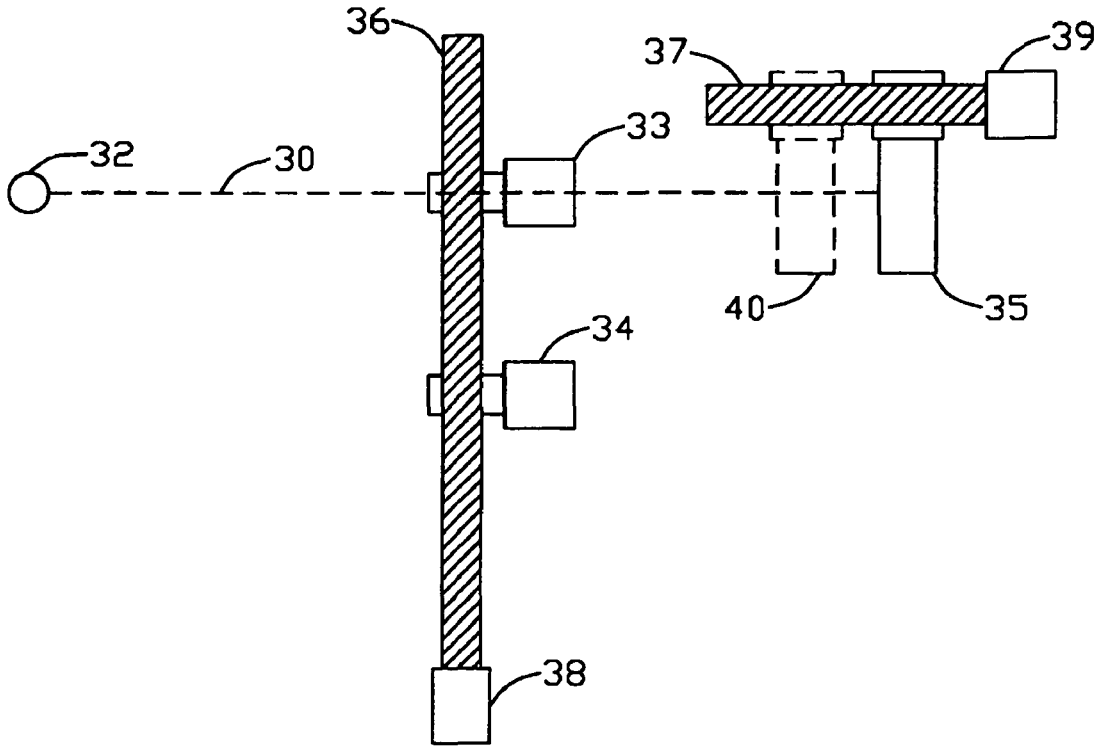

Following, one preferred embodiment is described in FIG. 3A and FIG. 3B. The other one is described in FIG. 4A and FIG. 4B.

FIG. 3A is a schematic diagram showing the correlative locations for the devices in some modules. Dash line 30 represents running light of a pathway for any scanning motion. A visible light source 31 is used for the first-time scanning motion of an object (not shown). A first lens 33 and a second lens 34, both on a feeding screw 36 driven by a motor 38, are lens of the image capture 13 with different optical properties, such as focus and magnification. The second lens 34 is used when the visible light source 31 is as light source for scanning. A sensors array 35 of the image capture module 13, fed by a feeding screw 37 driven by a motor 39, is at a first suitable location for using the visible light source 31 such that a first image length for the first-time scanning motion is made.

As shown in FIG. 3B, when an infrared light source 32 is used for the second-time scanning motion of the object (not shown), the first lens 33 is fed to a second suitable location such that a first object length for the second-time scanning motion is made. Moreover, the sensors array 35 is also fed to a third location that is different from the location 40 of the sensors array 35 for the first-time scanning motion, so that a second image length for the second-time scanning motion is made.

Figure 4A:
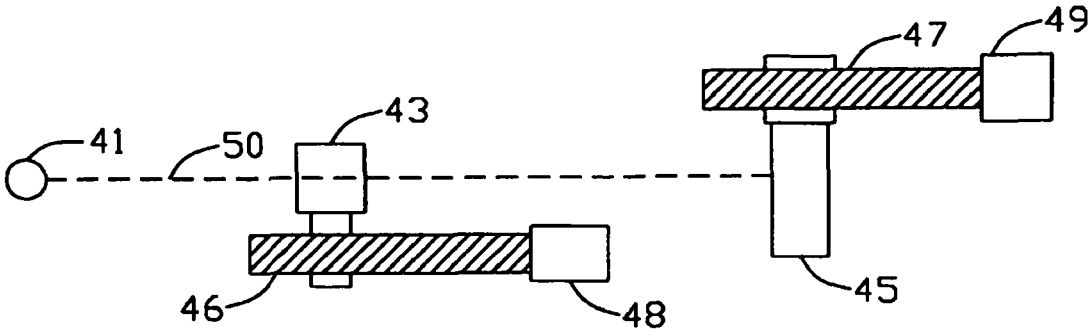
FIGS. 4A-4B are the schematic diagrams of devices in other one preferred embodiment of the present invention.
Figure 4B:
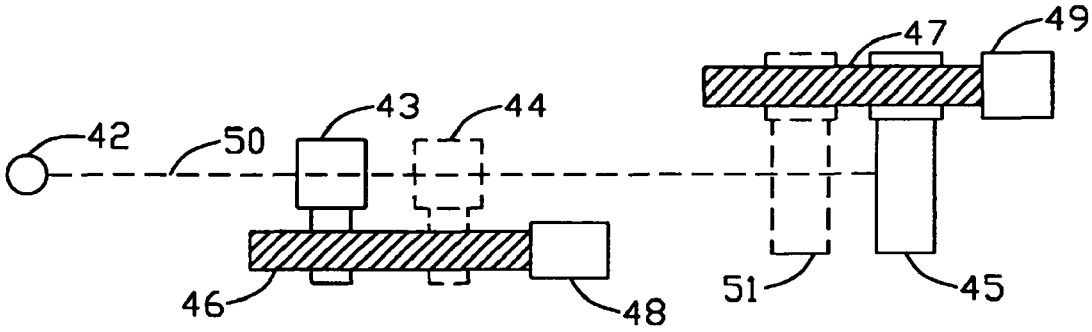

The other one preferred embodiment is shown as FIG. 4A and FIG. 4B. FIG. 4A is a schematic diagram showing correlative locations for the devices in some modules. Dash line [41] *50* represents a running light pathway for a scanning motion. A visible light source 41 is used for the first-time scanning motion of an object (not shown). A lens 43, on a feeding screw 46 driven by a motor 48, is fed a fourth suitable location for using the visible light source 41 as light source. A sensors array 45 of the image capture module 13, fed by a feeding screw 47 driven by a motor 49, is at a fifth suitable location for the visible light source 41 as light source.

As shown in FIG. 4B, when an infrared light source 42 is used for the second-time scanning motion of an object (not shown), the lens 43 is fed to a sixth suitable location that is different from the first location 44. Moreover, the sensors array 45 is also fed to a seventh location different from the second location 51 of the sensors array 45 for the first-time scanning motion.

Accordingly, with adjusting the distance between the object and the lens or the sensors array, some optical defeats resulting from using different light sources can be compensated for getting better scanning images.

While the present invention has been described herein in terms of preferred embodiments, numerous modifications and variations will occur to a person the spirit and scope of the present invention. It is intended that the appended claims encompass those modifications and variations.

What is claim is:

1. [Apparatus for scanning an object] *An apparatus* comprising:

an image capture module [having at least] *including* a lens and [a sensors array for capturing] *an image sensor configured to capture* light [after] *in response to* scanning [said] *an* object;

a plurality of light sources with different wavelengths [for projecting said object through] *configured to transmit said light to* said image capture module*, wherein one of said light sources is selected for scanning said object*; *and* a [first] translation module [connected with said lens and said sensors array of said image capture module, and said first translation module for changing] *configured to change* a [first location of said lens and a second] location of said [sensors array according to using different said light sources; and a power module connected with said first translation module and said light sources for supporting energy to said first translation module and said light sources] *image sensor with respect to said selected light source*.

2. The apparatus of claim 1, wherein said light sources comprise a visible light source and an infrared light source.

3. The apparatus of claim 1, wherein said [first] location is in a light pathway between said object and said lens.

4. The apparatus of claim 1, wherein said [second] location is in [the] *a* light pathway between said lens and said [sensors array] *image sensor*.

5. The apparatus of claim 1, wherein said [first] translation module comprises a plurality of feeding screws and feeding rods.

6. The apparatus of claim 1, *further comprising a power module operably connected with said translation module and configured to provide energy to said translation module and said light sources,* wherein said power module comprises a plurality of power supplies, motors, gears, and belts.

7. The apparatus of claim 1 further comprising:

a second translation module connected with said light sources and said image capture module[, and said second translation driven by said power module];

a control module connected with [said power module and] said image capture module; and a loading platform module having a platform and therein all said modules and said light sources placed.

8. The apparatus of claim 7, wherein said control module comprises a plurality of host units for data processing and circuits for executing scanning process.

9. A scanner comprising:

an image capture module having at least a lens and a sensors array for capturing light after scanning an object;

a plurality of light sources comprising *a* visible light source and an infrared light source;

a first translation module connected with said lens and said sensors array of said image capture module, [and] said first translation module for changing a first location of said lens and a second location of said sensors array according to using different said light sources;

a power module connected with said first translation module and said light sources for supporting energy to said first translation module and said light sources;

a second translation module connected with said light sources and said image capture module, [and] said second translation driven by said power module;

a control module connected to said power module and said image capture module; and a loading platform module having a platform and therein all said modules and said light sources placed.

10. The scanner of claim 9, wherein [the] *a* distance between said first location and said object is an object length in a light pathway.

11. The scanner of claim 9, wherein [the] *a* distance between said second location and said lens is an image length in [said] *a* light pathway.

12. The scanner of claim 9, wherein said first translation module comprises a plurality of feeding screws and feeding rods.

13. The scanner of claim 9, wherein said power module comprises a plurality of power supplies, motors, gears, and belts.

14. A method [of scanning by a scanner] comprising:

[using] *selecting a light source from* a plurality of light sources *of a scanner configured to scan an object* with different wavelengths*, wherein said scanner comprises a lens and an image sensor*;

changing*, with a translation module,* a first location of [a] *said* lens according to *the selection of* said light source; and changing a second location of [a sensors array] *said image sensor* according to *the selection of* said light source.

15. The method [according to] *of* claim 14, wherein said light sources [are] *comprise* a visible light source and an infrared light source.

16. The method [according to] *of* claim 14, wherein [the] *a* distance between said first location and said object is an object length in an imaging system and is changed by a [plurality of] first translation [devices] *device*.

17. The method [according to] *of* claim [14] *16*, wherein [the] *a* distance between said second location and said lens is an image length in said imaging system and is changed by a [plurality of] second translation [devices] *device*.

*18. A scanning apparatus, comprising:*

*an image capture module including an image sensor;*

*a first light source having a first range of wavelengths;*

*a second light source having a second range of wavelengths;*

*a control module configured to select one light source from a group consisting of said first and second light sources; and*

*a translation module configured to change a location of said image sensor with respect to said one light source in response to a selection of said one light source.*

*19. The apparatus of claim 18, wherein said image capture module further includes a lens, and wherein said translation module is further configured to change a location of said lens in response to the selection of said one light source.*

*20. The apparatus of claim 18, wherein said first light source comprises a light source configured to generate visible light.*

*21. The apparatus of claim 20, wherein said second light source comprises a light source configured to generate infrared light.*

*22. The apparatus of claim 18, wherein said control module is configured to select said one light source based, at least in part, on a type of object to be scanned.*

*23. A method comprising:*

*selecting one light source from a plurality of light sources based, at least in part, on a type of object to be scanned; and*

*changing, with a translation module, a location of a sensor array with respect to said one light source, at least in part, in response to the selection of said one light source, wherein said location of said sensor array is changed prior to said object being scanned.*

*24. The method of claim 23, wherein said selecting said one light source comprises selecting said one light source from a group of light sources consisting of a visible light source and an infrared light source.*

*25. The method of claim 23, further comprising changing a location of a lens, at least in part, in response to the selection of said one light source.*

*26. The method of claim 23, wherein said plurality of light sources comprises:*

*a first light source configured for a first document type; and*

*a second light source configured for a second document type.*

*27. The method of claim 26, wherein said first light source comprises a first range of wavelengths, and wherein said second light source comprises a second range of wavelengths different than said first range of wavelengths.*

*28. The method of claim 26, wherein said first document type comprises an opaque object, and wherein said second document type comprises a transparent object.*

*29. The method of claim 26, wherein said plurality of light sources comprises an infrared light source.*

*30. The apparatus of claim 18, wherein said first light source is selected when said type of object comprises an opaque object, and wherein said second light source is selected when said type of object comprises a transparent document.*

*31. The method of claim 23, wherein said plurality of light sources are associated with different wavelengths.*

* * * * *

UNITED STATES PATENT AND TRADEMARK OFFICE

CERTIFICATE OF CORRECTION

PATENT NO. : RE42,710 E
APPLICATION NO. : 11/283479
DATED : September 20, 2011
INVENTOR(S) : Chang It is certified that error appears in the above-identified patent and that said Letters Patent is hereby corrected as shown below:

Title Page, item (57), under "Abstract", in Column 2, Line 8, delete "is-used" and insert -- is used --.

Column 6, line 22, in Claim 23, delete "*method*" and insert -- *method*, --.

Signed and Sealed this
Twentieth Day of March, 2012

David J. Kappos

David J. Kappos
*Director of the United States Patent and Trademark Office*